(12) United States Patent
Heinz et al.

(10) Patent No.: US 12,551,832 B2
(45) Date of Patent: Feb. 17, 2026

(54) LIQUID SEPARATOR

(71) Applicant: Joma-Polytec GmbH, Bodelshausen (DE)

(72) Inventors: Stefan Heinz, Bodelshausen (DE); Oliver Vollmer, Rottenburg (DE)

(73) Assignee: Joma-Polytec GmbH, Bodelshausen (DE)

( * ) Notice: Subject to any disclaimer, the term of this patent is extended or adjusted under 35 U.S.C. 154(b) by 362 days.

(21) Appl. No.: 18/280,814

(22) PCT Filed: Sep. 15, 2022

(86) PCT No.: PCT/EP2022/075682
§ 371 (c)(1),
(2) Date: Sep. 7, 2023

(87) PCT Pub. No.: WO2023/041667
PCT Pub. Date: Mar. 23, 2023

(65) Prior Publication Data
US 2024/0139664 A1  May 2, 2024

(30) Foreign Application Priority Data
Sep. 16, 2021 (DE) .................... 10 2021 123 966.4

(51) Int. Cl.
*B01D 46/00* (2022.01)
*B01D 46/12* (2022.01)

(52) U.S. Cl.
CPC ......... *B01D 46/0031* (2013.01); *B01D 46/12* (2013.01)

(58) Field of Classification Search
None
See application file for complete search history.

(56) References Cited

U.S. PATENT DOCUMENTS

| 3,633,342 A | 1/1972 | Richardson |
| 3,884,660 A | 5/1975 | Perry, Jr. et al. |

(Continued)

FOREIGN PATENT DOCUMENTS

| DE | 1262288 B | 3/1968 |
| DE | 2411801 A1 | 6/1975 |

(Continued)

OTHER PUBLICATIONS

International Search Report from corresponding PCT Application No. PCT/EP2022/075682, Dated Dec. 5, 2022.

(Continued)

*Primary Examiner* — Brit E. Anbacht
(74) *Attorney, Agent, or Firm* — Harness, Dickey & Pierce, P.L.C.

(57) ABSTRACT

The invention relates to a liquid separator for separating liquid from a gas-liquid mixture, having a housing, an inlet, an outlet, a flow path connecting the inlet to the outlet, and a separating device, arranged in the flow path, for liquid separation, wherein a wall body is attached to the inner side of a housing portion adjoining the outlet, surrounds an annular collar projecting into the housing from the outlet, and extends towards a liquid outlet, wherein the wall body, together with a wall of the housing, defines a flow channel so that liquid collected at the outlet can be discharged through the flow channel via the liquid outlet.

13 Claims, 6 Drawing Sheets

(56) References Cited

U.S. PATENT DOCUMENTS

| | | | |
|---|---|---|---|
| 2005/0044825 A1 | 3/2005 | Bazzarella et al. | |
| 2008/0271421 A1 | 11/2008 | Darke et al. | |
| 2009/0242481 A1 | 10/2009 | Barents | |
| 2011/0048696 A1 | 3/2011 | Holte | |
| 2022/0347613 A1 | 11/2022 | Heinz et al. | |
| 2022/0410053 A1* | 12/2022 | Wright | B01D 46/2414 |
| 2023/0372853 A1* | 11/2023 | Marshall | B01D 46/0031 |
| 2024/0139664 A1* | 5/2024 | Heinz | B01D 45/18 |

FOREIGN PATENT DOCUMENTS

| | | |
|---|---|---|
| DE | 102014013372 A1 | 3/2016 |
| JP | S60-235661 A | 11/1985 |
| WO | WO-2021/083486 A1 | 5/2021 |

OTHER PUBLICATIONS

Search Report from corresponding German Application No. 10 2021 123 966.4, Dated May 17, 2022.

Written Opinion from corresponding PCT Application No. PCT/EP2022/075682, Dated Dec. 5, 2022.

* cited by examiner

LIQUID SEPARATOR

CROSS-REFERENCE TO RELATED APPLICATIONS

This application is a national phase application of PCT Application No. PCT/EP2022/075682, filed on 15 Sep. 2022, which claims the benefit of and priority to German Patent Application No. 10 2021 123 966.4, filed on 16 Sep. 2021. The entire disclosures of the applications identified in this paragraph are incorporated herein by references.

BACKGROUND

The invention relates to a liquid separator for separating liquid from a gas-liquid mixture having the features of the preamble of claim 1.

Liquid separators are known from the prior art. These can operate according to different functional principles—for example, via condensation, centrifugal force (cyclone), sorption (use of a sorbent), or via baffles.

Liquid separators can be used, for example, in fuel cells, where, in order to increase efficiency, on the cathode side, water is separated from oxygen ($O_2$) using a liquid separator, and, on the anode side, water is separated from hydrogen ($H_2$) using a (further) liquid separator. Liquid separators can also be used in compressed air systems or air conditioning systems.

DE 10 2014 013 372 A1 shows a centrifugal water separator for a fuel-cell system, in which a gas-liquid mixture is introduced tangentially into the separator via an inlet line, wherein liquid collects by centrifugal force influences on the inner wall of the separator and flows downwards through a drain, wherein the gas (possibly residual moisture) is discharged upwards via an outlet line. This separator has a low pressure differential, but is capped with respect to the separation efficiency, since a high proportion of residual moisture can be "entrained" by the outlet line.

WO 2021/083486 A1 discloses a liquid separator in which a gas-liquid mixture is introduced into the separator through an inlet, passes through a baffle separator equipped with several fabric sections, and is discharged via an outlet. This separator allows high separation efficiencies to be achieved with a compact design. Depending upon the liquid proportion in the gas-liquid mixture, increased pressure differentials may possibly occur.

US 2009/0 242 481 A1, US 2011/0 048 696 A1, DE 12 62 288 A, and US 2005/0 044 825 A1 each show a liquid separator with features of the preamble of claim 1.

SUMMARY

The object underlying the invention is that of facilitating reliable separation of liquids using simple constructive means and a compact design. It is desirable for high separation efficiencies to be able to be achieved at comparatively low pressure differentials.

The invention achieves this object by means of a liquid separator having the features of claim 1.

The liquid separator serves to separate liquid from a (flowing), and in particular vaporous or mist-like, gas-liquid mixture (liquid-loaded gas stream).

The gas-liquid mixture is in particular a mixture in which gas serves as a carrier medium, and liquid is present in the form of finely-distributed liquid droplets.

The liquid separator has a housing, an inlet into the housing (gas-liquid mixture inlet), an outlet from the housing (gas outlet), and a flow path (flow connection) that connects the inlet to the outlet. Arranged in the flow path is a separating device, where the actual separation of liquid from the gas-liquid mixture takes place. The separated liquid can be a pure liquid or a liquid mixture (mixture of two or more different liquids).

The liquid separator is characterized in that a wall body is attached to the inner side of a housing portion adjoining the outlet, surrounds (radially outwards) an annular collar projecting into the housing from the outlet, and extends (with a portion) towards a liquid outlet of the liquid separator. The wall body, together with a wall of the housing (housing wall in the relevant housing portion), defines a flow channel. A gap, and in particular an annular gap, which connects the interior of the housing to the flow channel, remains at the outlet between the wall body and the annular collar. As a result, liquid collected at the outlet can be discharged from the interior through the gap and the flow channel via the liquid outlet to the outside (out of the liquid separator).

It has been realized in accordance with the invention that a comparatively high degree of efficiency can be achieved with the liquid separator, but that the high speed of the gas (largely freed of liquid) may possibly prevent the liquid from flowing back to the liquid outlet. It has been realized that, with a high liquid content, the mass flow of the gas can be greater than the mass of the liquid, e.g., water, separated by means of the separating device. The liquid thus cannot flow to the liquid outlet due to gravity and is pressed by the mass flow of the gas into problem zones, e.g., into corner regions adjoining the outlet of the liquid separator. These corner regions can be filled with liquid until they are completely filled. As soon as this filling occurs, the mass flow of the gas takes up the liquid again, and liquid separation is thus no longer given to a sufficient extent.

It has been realized that the speed of the mass flow of the gas must be reduced so that the separated liquid can flow on the inner side of the housing to the liquid outlet due to gravity. For this purpose, a flow channel or water channel, which is separated from the (main) gas mass flow, is provided. This is achieved by the wall body which surrounds an annular collar projecting into the housing from the outlet and extends towards a liquid outlet, wherein the wall body, together with a wall of the housing, defines a flow channel, and a gap, which connects the interior of the housing to the flow channel, remains at the outlet between the wall body and the annular collar so that liquid collected at the outlet can be discharged from the interior through the gap and the flow channel via the liquid outlet.

At the gap, the flowing gas/liquid mixture, which is already partially dehumidified by passing through the separating device, is delayed by hitting the gap, wherein liquid portions are pressed through the gap. The gas flow is deflected in the direction of the outlet. The flow is calmed behind the gap, i.e., in the flow channel. While flow speeds of 40 to 50 m/s can occur in the interior of the liquid separator, they are only approximately 5 m/s (meters/second) in the flow channel.

Advantageously, a drainage gap can be formed between the inlet and the separating device, which drainage gap connects the interior of the inlet to that part of the interior of the housing (flow connection) that is arranged outside the separating device. The drainage gap thus constitutes a "water drainage channel." As a result, liquid can be discharged from the inlet through the drainage gap via the liquid outlet. In the liquid separator, this allows the earliest possible separation of liquid portions, such as liquid water. The drainage gap enables the liquid portion of the gas-liquid mixture, e.g., liquid water, to flow off to the liquid outlet before the gas-liquid mixture is fed to the separating device. Thus, this liquid portion does not have to be separated by the separating device and cannot pass into problem zones, such as corner regions at the outlet.

The wall body has an annular portion (collecting portion) which surrounds the projecting annular collar of the outlet, wherein a tongue-like portion (discharge portion) is connected to the annular portion and extends from the annular portion to the liquid outlet. Thus, an assembly or a component is provided, by means of which liquid can be collected at the outlet or separated from the gas-liquid mixture flow (annular portion) and can be guided due to gravity to the liquid outlet (tongue-like portion). The wall body, together with the relevant portion of the housing of the liquid separator, forms a calmed ("windstill") region in which the liquid can collect and then flow in the flow channel to the liquid outlet by means of gravity. The tongue-like portion can extend substantially in a cuboid shape or be designed as a portion or segment of a shell-shaped rotation body.

The flow channel can have two channel portions, viz., an annular channel (channel portion between the housing wall and the annular portion) and a discharge channel (channel portion between the housing wall and the tongue-like portion).

The wall body can be composed of the annular portion and the tongue-like portion ("built wall body" or assembly). Alternatively, the wall body can be formed in one piece (materially-uniform component). In the case of the design of the wall body from plastic, an injection-molding process is conceivable, for example. In the case of the design of the wall body from metal, a sand-casting process would be conceivable.

Advantageously, the annular portion can taper towards the outlet from a first axial end (facing the separating device) to a second axial end (facing away from the separating device), wherein the gap that connects the interior of the housing to the flow channel remains between the second axial end of the annular portion and the inward-projecting annular collar of the outlet, and wherein the annular portion abuts, with its first axial end, sealingly against the inner side of the housing at least over a part of the circumference—in particular, in the upper half of the circumference in relation to the direction of gravity. As a result, liquid which, for example, passes to the outlet through the gas mass flow can pass from the interior of the housing into the flow channel and thereby flow off to the liquid outlet. Undesired escape of liquid from the flow channel can be largely prevented. The gap is oriented in particular parallel to the central longitudinal direction of the housing of the liquid separator (axial gap). The gap is formed along the circumferential direction at least in portions or completely circumferentially (annular gap).

Expediently, two (lateral) wall portions, which enclose between them, at least for the greater part, the tongue-like portion along the extension thereof, can extend on the inner side of the housing. As a result, liquid which has passed into the flow channel can be reliably guided to the liquid outlet, since undesired escape of the liquid from the flow channel is largely avoided. The wall of the housing of the liquid separator (housing wall), the tongue-like portion, and the two lateral wall portions together define a portion of the flow channel.

Preferably, the wall portions already end at a defined distance before the annular portion of the wall body, so that a passage remains in each case between the wall portions and the annular portion. In other words, the wall portions are not formed continuously up to the annular portion. As a result, liquid which—for example, in the form of droplets or of a liquid film—drains on the inner side of the housing wall along the direction of gravity can enter through the passage into the flow channel or the discharge portion of the flow channel.

In the context of a preferred design, the liquid separator can have a partition wall in its housing interior, which partition wall divides the interior of the housing between the separating device and the outlet into two regions, wherein the partition wall abuts against the separating device and against the wall body. As a result, the separating device is supported against the flow direction relative to the wall body or to the outlet. This promotes a stable design even at high flow speeds in the liquid separator. Moreover, the flow in the housing of the liquid separator can be calmed—for example, by reducing turbulence. The partition wall can contact the tongue-like portion and the annular portion.

Expediently, the partition wall and the wall body can be connected to one another, and in particular formed in one piece. This facilitates the assembly and possibly also the production of the liquid separator, since the number of components can be kept low, and the partition wall and the wall body can be handled as one component.

The partition wall can advantageously extend along a central longitudinal plane, and in particular between the end, facing away from the inlet, of the separating device and the wall body. A holding portion can be formed on the end, facing the separating device, of the partition wall, at which holding portion the separating device can abut or abuts, with its end facing away from the inlet, against the partition wall. The holding portion can have a central longitudinal plane oriented orthogonally to the central longitudinal plane of the partition wall. The holding portion provides an additional baffle plate, on which a gas-liquid mixture, which has already passed through the separating device and is therefore already partially dehumidified, can impinge. As a result, liquid portions from the gas-liquid mixture can adhere to the holding portion and can flow off along the direction of gravity (downwards) in particular to the liquid outlet. On the rear side of the holding portion or on the partition wall, flow-calmed regions ("wind shadows") can form as a result. In them, liquid can condense and—for example, as a liquid film or in droplet form—flow off towards the liquid outlet.

The holding portion can advantageously have lateral end portions which are curved or angled towards the separating device. As a result, an increased deflection of the gas/liquid mixture(s) that have already passed through the separating device and, out of the separating device, impinge on the holding portion and its end portions can take place. This promotes the separation rate. The end portions can be designed as planar portions angled relative to the holding portion or the central longitudinal plane thereof, or as arc-shaped wing portions or flaps.

Preferably, the holding portion, together with its lateral end portions, can be dimensioned in such a way that it projects beyond the cross-section of the separating device at the free end (facing the holding portion or the partition wall), and thus "goes beyond" this cross-section. This increases the flow-calmed regions that form at the holding portion or at the partition wall, which in turn promotes the separation rate.

The partition wall can have one or two partition wall portions which extend laterally next to the holding portion of the partition wall next to the separating device (partition wall portions and separating device overlap axially). The partition wall portions can help to calm the flow in the housing of the liquid separator.

Specifically, the inlet can have an annular collar projecting—in particular, axially—into the interior of the housing, wherein the separating device has an annular connection part which engages around the annular collar, wherein the annular collar and the annular connection part enclose the drainage gap between them, wherein the inner cross-section of the annular collar (clear cross-section of the annular collar) widens towards the drainage gap. As a result, a region which starts at the inlet and in which the flow speeds are reduced due to the enlarged cross-section ("wind shadow") can be provided before the drainage gap. This promotes a flow-off of liquid portions, since the reduced flow speeds reduce the risk of liquid portions being swept along into the separating device. The inner cross-section can be widened at the annular collar in that the inner contour of the annular collar approaches the outer contour of the annular collar towards the free end of the annular collar (inner cross-section increases towards the free end of the annular collar).

Advantageously, the inner cross-section of the separating device can increase towards the drainage gap. As a result, liquid (liquid portion) separated off in the separating device can drain towards the drainage gap, for example. Alternatively or additionally, drainage openings which face the liquid outlet can be formed in the separating device itself.

In the context of a preferred embodiment, the inner cross-section of the separating device and/or the inner cross-section of the annular collar (clear cross-section of the annular collar) at the drainage gap can be maximal. In other words, the largest free cross-section is located at the drainage gap or the water drainage channel. Due to the enlarged cross-section, the flow speed prevailing there is comparatively low. This promotes a flow-off of liquid through the drainage gap.

Expediently, the separating device can be designed as a fabric separator with at least one fabric portion for liquid separation. This contributes to a high liquid separation efficiency.

The separating device can have a separator housing which has an annular connection part (see above) and a fabric holding part by means of which the fabric portion(s) are held. In the region of the fabric portions, the separator housing can have a U-shaped or V-shaped cross-section which is closed at the free end (facing away from the annular connection part)—for example, by means of a corresponding end wall.

The fabric portion(s) can be formed from metal fabric, wherein a heating device can be optionally provided, by means of which the metal fabric can be heated. Alternatively, the fabric portion(s) can be formed from plastic fabric. Irrespective of the fabric material, the fabric portions can optionally have a hydrophilic coating.

Preferably, the separating device can have two fabric portions which are arranged symmetrically relative to a main flow direction in the separating device, wherein the fabric portions together enclose an angle of 2° to 30°, preferably of 2° to 20°, and further preferably of 4° to 8°. In this way, a comparatively large separating surface can be created with a compact design. Any pressure differentials arising can be kept low.

In the context of a preferred embodiment, the housing can have a first housing part in which the inlet is arranged (inlet-side housing part) and a second housing part in which the outlet is arranged (outlet-side housing part), wherein the housing parts in the connected state abut against one another at a parting plane.

This facilitates access to the interior of the respective housing parts, which promotes production of the liquid separator. The housing parts can be designed in such a way that the parting plane is oriented orthogonally to the central longitudinal direction along which the housing of the liquid separator extends. The housing parts can each have a connecting flange at the parting plane so that the housing parts can be coupled by means of a flange connection—for example, by screwing. The housing parts can each be designed as a housing-half. The liquid outlet can be formed on the second housing part, and in particular adjacent to the connecting flange. In the installed position of the liquid separator, the liquid outlet is arranged downwards in the direction of gravity so that liquid or liquid portions can be discharged via the liquid outlet due to gravity.

Specifically, the housing of the liquid separator can extend along a central longitudinal direction, wherein the inlet and the outlet are arranged in alignment with one another. This contributes to a compact design of the liquid separator and promotes low pressure differentials. The central longitudinal axes of inlet and outlet can each be arranged to be parallel or congruent with the central longitudinal direction of the housing.

BRIEF DESCRIPTION OF THE DRAWINGS

The invention is explained in more detail below with reference to the figures, wherein identical or functionally identical elements are provided with identical reference signs, but, where applicable, only once. In the drawings.

DETAILED DESCRIPTION

Figure 1:
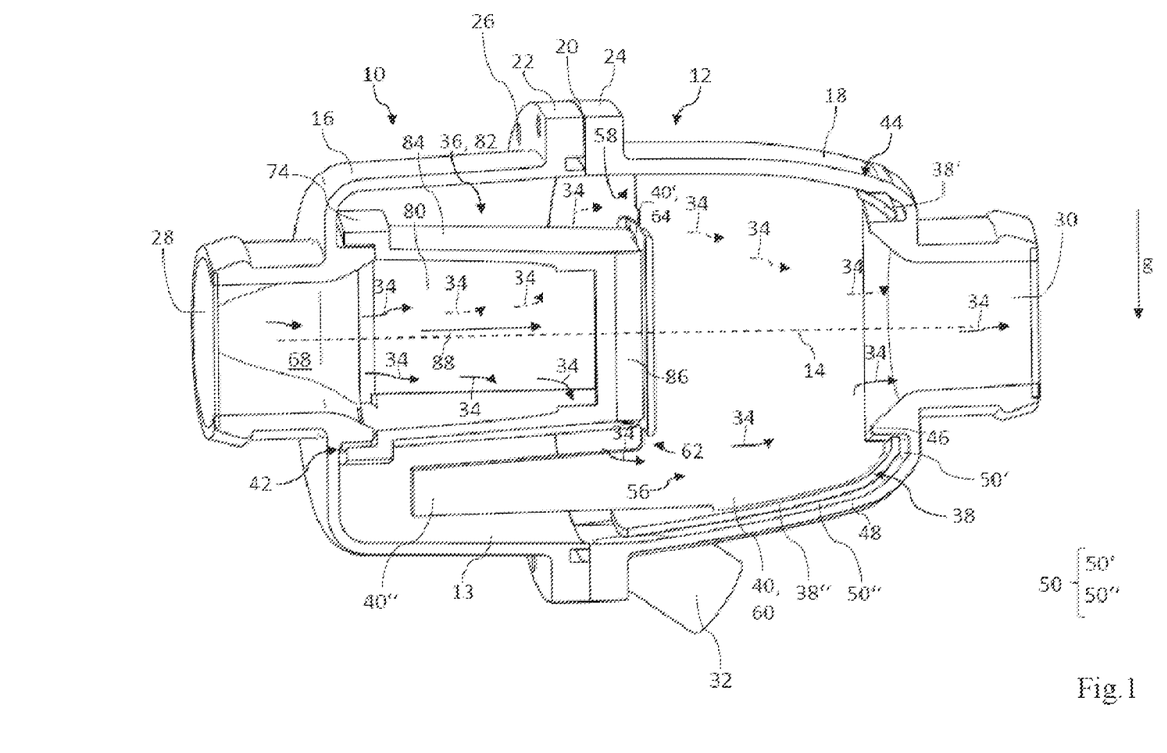
FIG. 1 shows an embodiment of the liquid separator in a half-section.

FIG. 1 shows a liquid separator for separating liquid from a flowing gas-liquid mixture, wherein the liquid separator is denoted as a whole by reference sign 10.

The liquid separator 10 in the example has a housing 12 which extends along a central longitudinal direction 14. The housing 12 has a first housing part 16 (inlet-side housing part) and a second housing part 18 (outlet-side housing part). In the connected state, the housing parts 16, 18 abut against one another at a parting plane 20.

The housing parts 16, 18 are designed in such a way that the parting plane 20 is oriented orthogonally to the central longitudinal direction 14. At the parting plane 20, the housing parts 16, 18 each have a connecting flange 22, 24 so that the housing parts 16, 18 can be coupled by means of a flange connection—in the example, by screwing. For this purpose, respectively corresponding passages 26 are formed on the connecting flanges. In the present case, the housing parts 16, 18 are designed as housing halves of substantially the same size.

An inlet 28, which leads into the interior 13 of the housing 12, is formed on the first housing part 16. An outlet 30, which leads out of the interior 13 of the housing 12, is formed on the second housing part 18. In the example, the inlet 28 and the outlet 30 are arranged in alignment with one another, as explained above. The liquid outlet 32 is formed on the second housing part 18, adjacent to the connecting flange 24. In the installed position of the liquid separator 10, the liquid outlet 32 is arranged downwards in the direction of gravity. As a result, liquid or liquid portions can be discharged from the interior of the housing 12 via the liquid outlet 32 due to gravity. The direction of gravity g is shown in FIG. 1.

The inlet 28 and the outlet 30 are connected to one another by a flow path 34, wherein a separating device 36 for liquid separation is arranged in the flow path 34 (flow path 34 is illustrated by the entirety of the arrows with reference sign 34, which lead from the inlet 28 to the outlet 30). In addition, the liquid separator 10 has, in the interior 13 of the housing 12, a wall body 38, a partition wall 40, and a drainage gap 42. This is described in more detail below.

Figure 2:
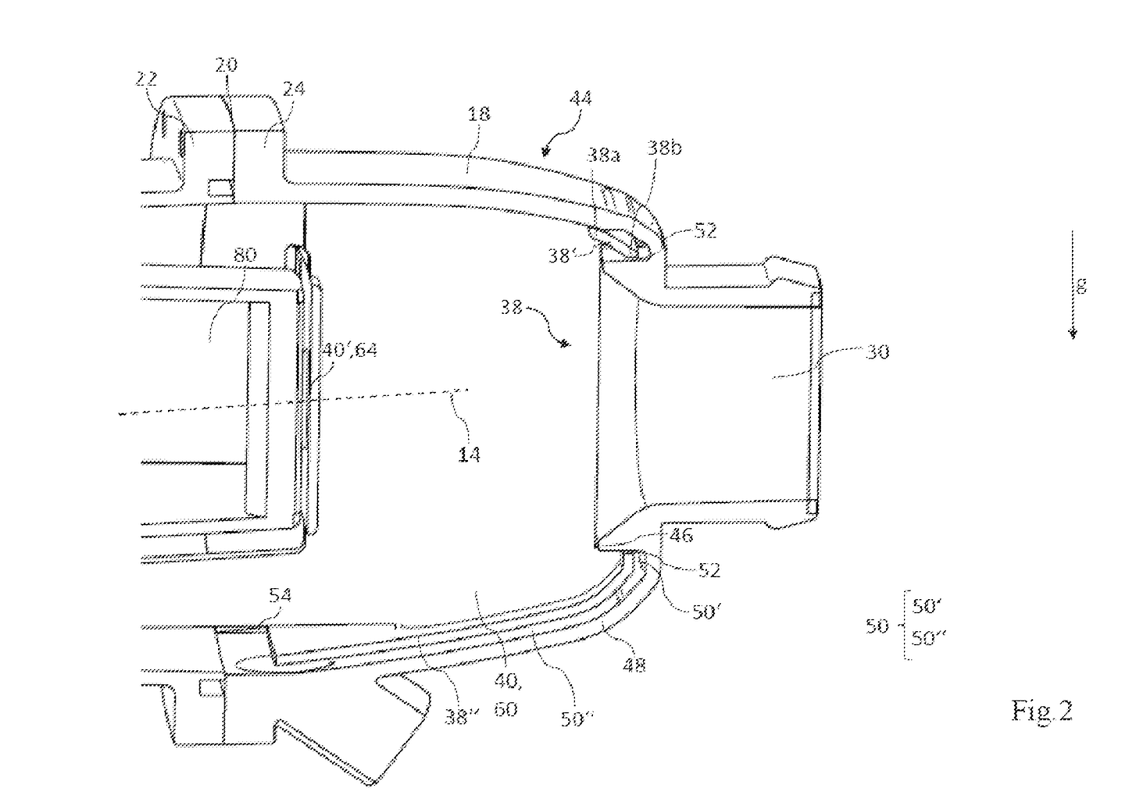
FIG. 2 shows the liquid separator of FIG. 1 in a half-section in the region of the outlet.

The wall body 38 is attached to the inner side of a housing portion 44 (portion of the second housing part 18) adjoining the outlet 30 (cf. FIGS. 1 and 2). The wall body 38 surrounds an annular collar 46 projecting into the housing 12 from the outlet 30 and extends towards the liquid outlet 32. The wall body 38, together with a wall 48 of the housing (wall of the second housing portion 18), defines a flow channel 50 so that liquid collected at the outlet 30 can be discharged through the flow channel 50 via the liquid outlet 32 to the outside.

The wall body 38 has an annular portion 38' which surrounds the inward-projecting annular collar 46 of the outlet 30, wherein a tongue-like portion 38" is connected to the annular portion 38' and extends from the annular portion 38' to the liquid outlet 32 (cf. FIGS. 1 and 2). In the example, the wall body 38 is formed in one piece.

In the example, the flow channel 50 has two channel portions, viz., an annular channel 50' (channel portion between the housing wall 48 and the annular portion 38') and a discharge channel 50" (channel portion between the housing wall 48 and the tongue-like portion 38").

Figure 3:
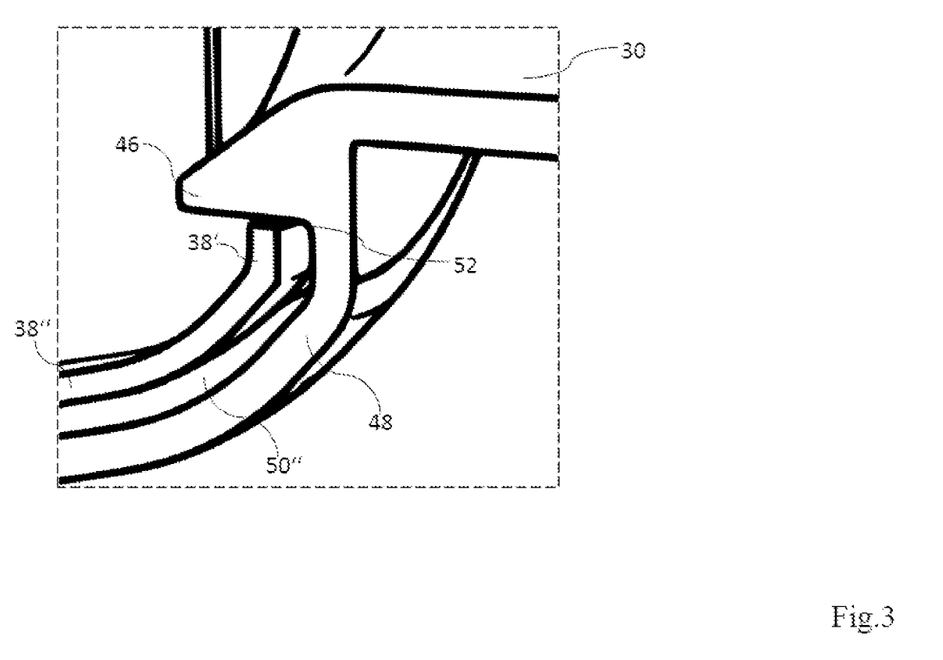
FIG. 3 is an enlarged partial view of the gap between the wall body and the outlet of the liquid separator of FIG. 1.

The annular portion 38' tapers towards the outlet 30 from a first axial end 38a (facing the separating device 36) to a second axial end 38b (facing away from the separating device 36; cf. FIG. 2), wherein a gap 52 which connects the interior 13 of the housing 12 to the flow channel 50 (cf. FIG. 3) remains between the second axial end 38b of the annular portion 38' and the inward-projecting annular collar 46 of the outlet 30. As a result, liquid which, for example, passes to the outlet 30 through the gas mass flow can pass from the interior 13 of the housing 12 through the gap 52 into the flow channel 50 and thereby flow off to the liquid outlet 32 (cf. FIGS. 2 and 3). The gap 52 is oriented in particular to be parallel to the central longitudinal direction 14 of the housing 12. The gap 52 is formed completely circumferentially (annular gap). In the example, the annular portion 38' abuts, with its first axial end 38a, sealingly against the inner side of the housing 12 at least over a part of the circumference—in particular, in the upper half of the circumference (not shown in detail) in relation to the direction of gravity g.

Two lateral wall portions 54, which enclose between them, at least for the greater part, the tongue-like portion 38" along the extension thereof (cf. FIGS. 5 and 6), extend on the inner side of the housing 12. The wall 48 of the housing 12 (housing wall 12), the tongue-like portion 38", and the two lateral wall portions 54 together define a portion of the flow channel 50.

Figure 6:
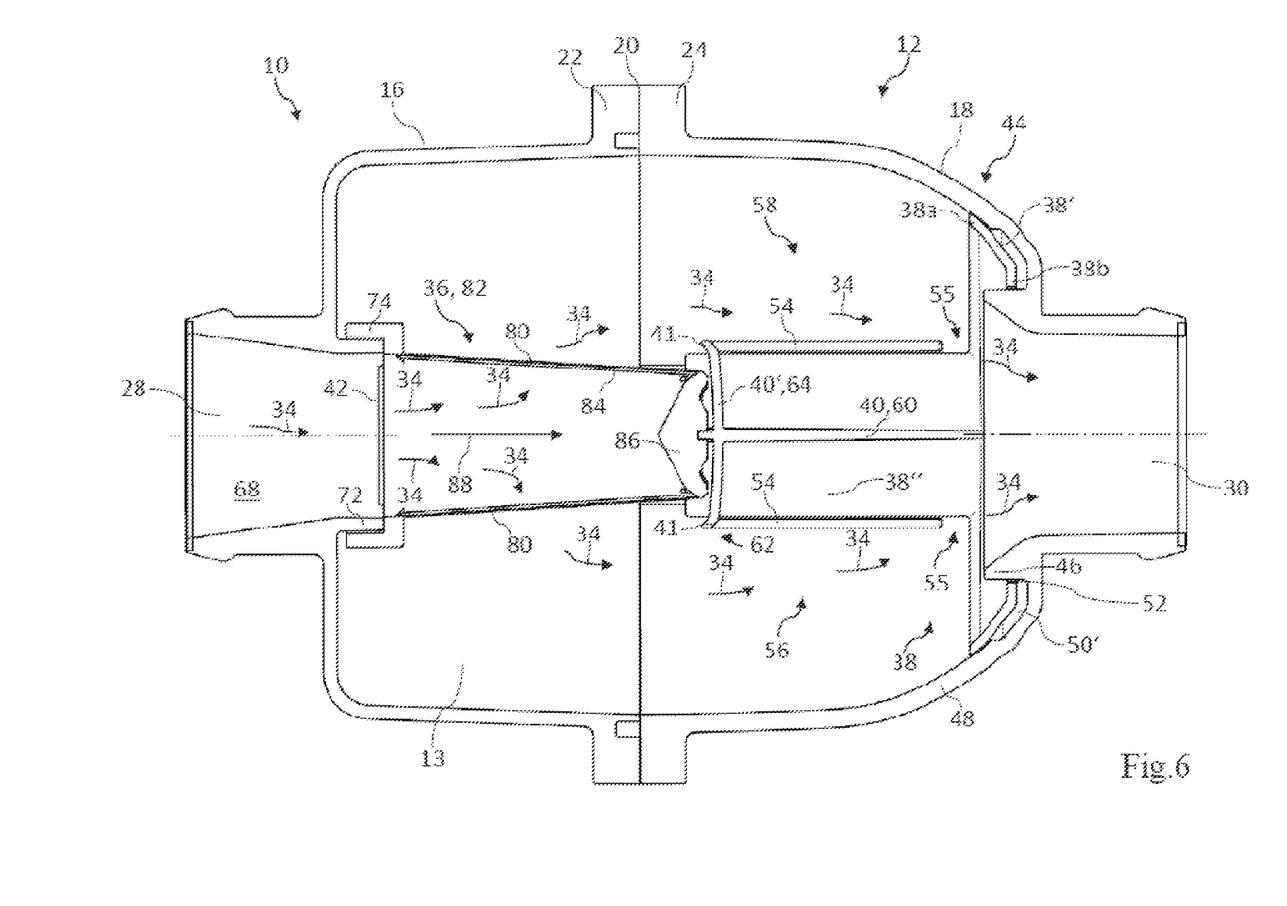
FIG. 6 shows the liquid separator of FIG. 1 in a half-section, with a sectional plane rotated, in comparison to FIG. 1, by 90° about the central longitudinal axis (view along the direction of gravity from top to bottom).

In the example, the wall portions 54 already end at a defined distance before the annular portion 38' of the wall body 38, so that a passage 55 remains in each case between the wall portions 54 and the annular portion 38' (cf. FIG. 6). As a result, liquid which—for example, in the form of droplets or of a liquid film—drains on the inner side of the housing wall 48 can enter through the passage 55 into the flow channel 50 or the discharge portion 50" of the flow channel 50.

The partition wall 40 divides the interior 13 of the housing 12 between the separating device 36 and the outlet 30 into two regions 56, 58. The partition wall 40 abuts against the separating device 36 and the wall body 38 (cf. FIGS. 1 and 6).

The partition wall 40 extends along a central longitudinal plane 60 between the end 62, which faces away from the inlet 28 or is free, of the separating device 36 and the wall body 38. A holding portion 40' is formed on the end, facing the separating device 36, of the partition wall 40, at which holding portion the separating device 36 abuts, with its end 62 facing away from the inlet 28, against the partition wall 40. The holding portion 40' has a central longitudinal plane 64 oriented orthogonally to the central longitudinal plane 60 of the partition wall 40.

In the example, the partition wall 40 has a partition wall portion 40" which extends laterally next to the holding portion 40' of the partition wall 40 next to the separating device 36 (cf. FIG. 1). The partition wall 40 and the wall body 38 can be designed to be connected to one another, and in particular in one piece.

Figure 5:
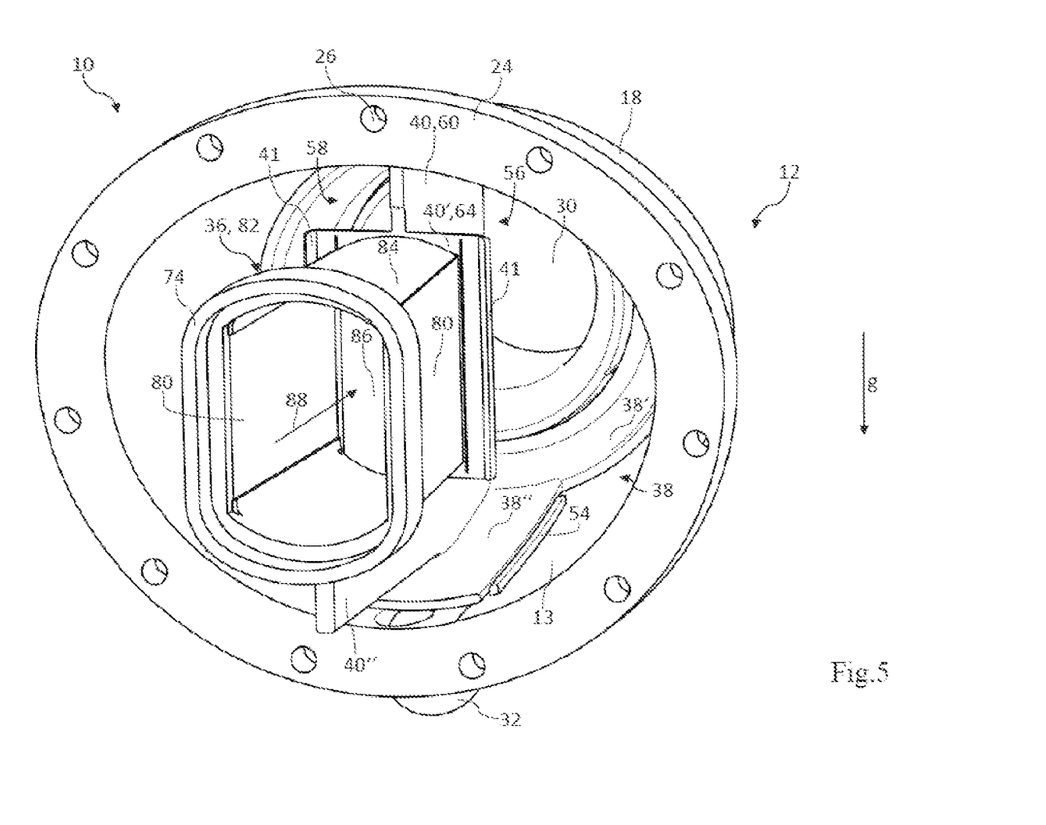
FIG. 5 shows the liquid separator of FIG. 1, with the housing half removed, with a view into the interior of the liquid separator.

The holding portion 40' has two lateral end portions 41 which are curved or angled towards the separating device 36 (cf. FIGS. 5 and 6). In the example, the end portions 41 are formed as wing portions that are arc-shaped relative to the holding portion 40' or the central longitudinal plane 64 thereof.

The holding portion 40', together with its lateral end portions 41, is dimensioned in the example in such a way that it projects beyond the cross-section of the separating device 36 at the free end 62 (facing the holding portion 40' or the partition wall 40), and thus "goes beyond" this cross-section (cf. FIG. 6).

Figure 4:
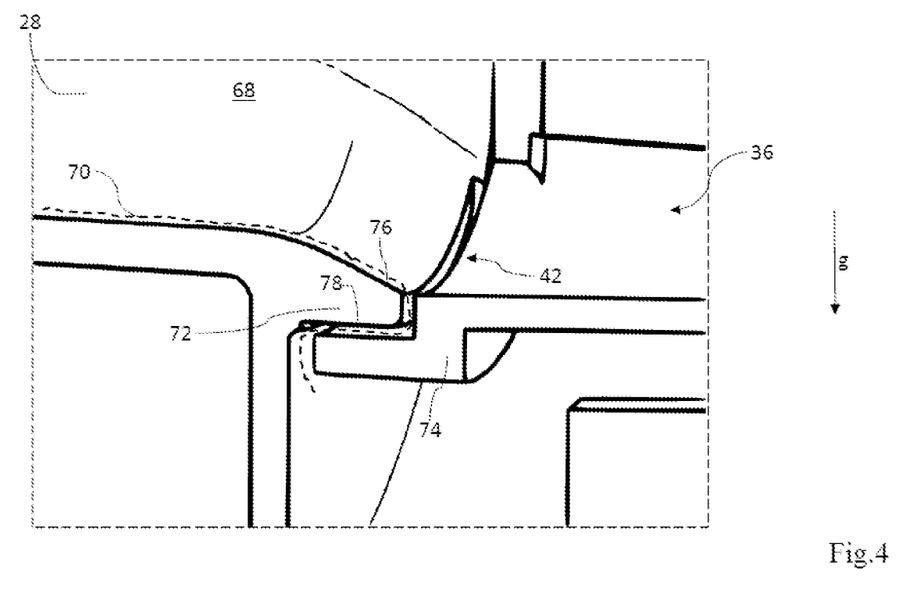
FIG. 4 is an enlarged partial view of the drainage gap between the inlet and the separating device of the liquid separator of FIG. 1.

Between the inlet 28 and the separating device 36, a drainage gap 42 is formed which connects the interior 68 of the inlet 28 to the part of the interior 13 of the housing 12 that is arranged outside the separating device 36 (cf. FIGS. 1 and 4). The drainage gap 42 thus constitutes a "water drainage channel." The drainage gap 42 is oriented in the direction of gravity g in a downward-oriented portion between the inlet 28 and the separating device 36. The drainage gap 42 enables the liquid portion of the gas-liquid mixture, e.g., liquid water, to flow off to the liquid outlet 32 before the gas-liquid mixture is supplied to the separating device 36 (illustrated by the dashed line 70).

The inlet 28 has an annular collar 72 projecting—in particular, axially—into the interior 13 of the housing 12, wherein the separating device 36 has an annular connection part 74 which engages around the annular collar 72, wherein the annular collar 72 and the annular connection part 74 enclose the drainage gap 42 between them, wherein the inner cross-section of the annular collar 72 (clear cross-section of the annular collar 72) widens towards the drainage gap 42 (cf.). As a result, a region which starts at the inlet 28 and has reduced flow speeds ("wind shadow") can be provided before the drainage gap 42, as explained above. This promotes a flow-off of liquid portions. The inner cross-section is widened at the annular collar 72 in that the inner contour 76 of the annular collar 72 approaches the outer contour 78 of the annular collar 72 towards the free end of the annular collar 72 (cf. FIG. 4).

In the example, the separating device 36 is designed as a fabric separator with two fabric portions 80 for liquid separation (cf. FIG. 1; as a result of the representation in a half-section, only one fabric portion 80 is shown). The separating device 36 has a separator housing 82 which has the annular connection part 74 and a fabric holding part 84, by means of which the fabric portions 80 are held (cf. FIG. 1). In the region of the fabric portions 80, the separator housing 82 has a U-shaped or V-shaped cross-section which is closed at the free end 62 (facing away from the annular connection part 74) by means of an end wall 86. The fabric portions 80 can be designed as described above.

The fabric portions 80 are arranged symmetrically relative to a main flow direction 88 in the separation device 36, wherein the fabric portions 80 together enclose an angle of, for example, 2° to 30°. The inner cross-section of the separating device 36 increases towards the drainage gap 42. As a result, liquid separated off in the separating device 36 can flow off towards the drainage gap 42, for example. Alternatively or additionally, drainage openings which face the liquid outlet 32 (not shown) can be formed in the separating device 36 itself.

The liquid separator 10 operates as follows:

A flowing gas-liquid mixture (liquid-loaded gas flow) is introduced into the liquid separator 10 through the inlet 28. The gas-liquid mixture is guided from the inlet 28 into the separating device 36.

At the transition from the inlet 28 into the separating device 36, the gas-liquid mixture passes through the drainage gap 42. As a result of the drainage gap 42, liquid portions which, for example, have collected on the inner surface of the inlet 28, can flow downwards along the direction of gravity to the liquid outlet 32. Because the inner cross-section of the annular collar 72 widens at the inlet 28 towards the free end, a region is formed in which the flow speed of the flowing gas-liquid mixture is reduced ("wind shadow"). As a result, liquid portions can be guided through the drainage gap 42 to the liquid outlet 32 before they pass into the separating device 36 (liquid portions are branched off before entry into the separating device 36).

The actual separation of liquid takes place in the separating device 36. For this purpose, the gas-liquid mixture is guided through the fabric portions 80, wherein liquid remains on the fabric portions 80, and the (possibly still partially liquid-loaded) gas flow passes through the fabric portions 80. The liquid remaining on the fabric portions 80 can flow via the drainage gap 42 and/or via drainage openings (not shown), which are formed in the separating device and face the liquid outlet 32, to the liquid outlet 32 and can be discharged via the latter to the outside.

The gas flow (possibly still loaded with residual moisture) that passes through the fabric portions 80 is divided into two partial flows, of which one partial flow is guided into the region 56 (on one side of the partition wall 40), and the other partial flow is guided into the region 58 (on the other side of the partition wall 40). This division into two partial flows is supported by the holding portion 40' together with its end portions 41.

From the regions 56, 58, the partial flows each pass to the outlet 30, via which the partial flows are guided out of the liquid separator 10. In this case, the partial flows move from the separating device 36 to the outlet 30 in an approximately arc-shaped movement path, wherein liquid portions of the partial flows, e.g., in droplet form, settle on the inner surface of the housing 12, and in particular on the second housing part 18.

From there, the liquid portions pass—in any case, proportionally—onto the wall body 38 arranged at the outlet 30. The liquid portions flow along the annular portion 38' and pass through the gap 52, which connects the interior 13 to the flow channel 50, into the flow channel 50, viz., into the annular channel 50'. From there, the liquid portions flow due to gravity into the discharge channel 50" underneath the tongue-shaped portion 38" to the liquid outlet 32, from where the liquid portions are guided out of the liquid separator 10.

What is claimed is:

1. Liquid separator for separating liquid from a gas-liquid mixture, having a housing, an inlet, an outlet, a flow path connecting the inlet to the outlet, and a separating device, arranged in the flow path, for liquid separation, wherein a wall body is attached to the inner side of a housing portion adjoining the outlet, wherein the wall body surrounds an inward-projecting annular outlet collar projecting into the housing from the outlet and extends towards a liquid outlet, wherein the wall body, together with a wall of the housing, defines a flow channel, and wherein a gap connecting the interior of the housing to the flow channel remains at the outlet between the wall body and the inward-projecting annular outlet collar so that liquid collected at the outlet can be discharged from the interior through the gap and through the flow channel via the liquid outlet, characterized in that the wall body has an annular portion surrounding the inward-projecting annular outlet collar, wherein a tongue-like portion is connected to the annular portion and extends from the annular portion to the liquid outlet.

2. Liquid separator according to claim 1, wherein a drainage gap is formed between the inlet and the separating device and connects the interior of the inlet to the part of the interior of the housing that is arranged outside the separating device.

3. Liquid separator according to claim 1, wherein the annular portion tapers towards the outlet from a first axial end to a second axial end, wherein the gap remains between the second axial end of the annular portion and the inward-projecting annular outlet collar at the outlet and connects the interior of the housing to the flow channel, and wherein the annular portion abuts, with its first axial end, at least over a part of its circumference, sealingly against the inner side of the housing.

4. Liquid separator according to claim 1, wherein two wall portions extend on the inner side of the housing and enclose between them the tongue-like portion along the extension thereof.

5. Liquid separator according to claim 1, wherein a partition wall which divides the interior of the housing between the separating device and the outlet into two regions, wherein the partition wall abuts against the separating device and against the wall body.

6. Liquid separator according to claim 5, wherein the partition wall and the wall body are connected to one another.

7. Liquid separator according to claim 5, wherein the partition wall extends along a central longitudinal plane, wherein, on the end facing the separating device of the partition wall, a holding portion is formed at which the separating device can abut or abuts, with its end facing away from the inlet, against the partition wall, wherein the holding portion has a central longitudinal plane which is oriented orthogonally to the central longitudinal plane of the partition wall.

8. Liquid separator according to claim 7, wherein the holding portion has lateral end portions which are curved or angled towards the separating device.

9. Liquid separator according to claim 2, wherein the inlet has an inward-projecting annular inlet collar projecting into the interior of the housing, wherein the separating device has an annular connection part which engages around the inward-projecting annular inlet collar, wherein the inward-projecting annular inlet collar and the annular connection part enclose the drainage gap between them, wherein the inner cross-section of the inward-projecting annular inlet collar widens towards the drainage gap.

10. Liquid separator according to claim 1, wherein the separating device is designed as a fabric separator having at least one fabric portion for liquid separation.

11. Liquid separator according to claim 10, wherein the separating device has two fabric portions which are arranged symmetrically relative to a main flow direction in the separating device, wherein the two fabric portions together enclose an angle of 2° to 30°.

12. Liquid separator according to claim 2, wherein the inner cross-section of the separating device increases towards the drainage gap.

13. Liquid separator according to claim 2, wherein the housing has a first housing part in which the inlet is arranged and a second housing part in which the outlet is arranged, wherein the housing parts abut against one another at a parting plane in the connected state.

* * * * *